US008527700B2

(12) United States Patent
Asano et al.

(10) Patent No.: US 8,527,700 B2
(45) Date of Patent: *Sep. 3, 2013

(54) COMPUTER AND METHOD FOR MANAGING STORAGE APPARATUS

(75) Inventors: Masayasu Asano, Yokohama (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/473,546

(22) Filed: May 16, 2012

(65) Prior Publication Data

US 2012/0226857 A1    Sep. 6, 2012

Related U.S. Application Data

(63) Continuation of application No. 12/453,807, filed on May 22, 2009, now Pat. No. 8,209,484.

(30) Foreign Application Priority Data

Mar. 12, 2009 (JP) ................................. 2009-059886

(51) Int. Cl.
  *G06F 12/16* (2006.01)
(52) U.S. Cl.
  USPC ................................. 711/114; 711/E12.103
(58) Field of Classification Search
  USPC .......................................... 711/114, E12.103
  See application file for complete search history.

(56) References Cited

U.S. PATENT DOCUMENTS

| | | | |
|---|---|---|---|
| 7,089,359 B2 | 8/2006 | Kaneda et al. | |
| 2004/0215879 A1* | 10/2004 | Matsunami et al. | 711/114 |
| 2005/0015475 A1 | 1/2005 | Fujita et al. | |
| 2005/0021562 A1 | 1/2005 | Idei et al. | |
| 2005/0091455 A1 | 4/2005 | Kano et al. | |

(Continued)

FOREIGN PATENT DOCUMENTS

| | | |
|---|---|---|
| EP | 1 986 091 A2 | 10/2008 |
| JP | 2003-15915 | 7/2001 |

(Continued)

OTHER PUBLICATIONS

Extended European Search Report, issued from the European Patent Office, in corresponding European Patent Application No. 09 17 4071, completed Jun. 20, 2012, pp. 1-9.

*Primary Examiner* — Hoai V Ho
*Assistant Examiner* — Tri Hoang
(74) *Attorney, Agent, or Firm* — Stites & Harbison PLLC; Juan Carlos A. Marquez, Esq.

(57) ABSTRACT

A management computer manages the pool application information that indicates a pool application for a pool and the application condition information that indicates the condition for the pool application. The management computer calculates an excess storage capacity based on a pool usage status for the pool. The management computer specifies a pool application for the pool and the condition for the pool application based on the pool application information and the application condition information. The management computer judges whether the specified condition is satisfied even in the case in which a storage area having a storage capacity equivalent to or less than the calculated excess storage capacity is deleted from the pool. In the case in which the result of the judgment is positive, the management computer defines a capacity equivalent to or less than the excess storage capacity as an unused capacity.

18 Claims, 13 Drawing Sheets

(56) References Cited

U.S. PATENT DOCUMENTS

| | | |
|---|---|---|
| 2007/0214338 A1 | 9/2007 | Mizuno et al. |
| 2008/0091748 A1 | 4/2008 | Beniyama et al. |
| 2008/0104350 A1 | 5/2008 | Shimizu et al. |
| 2008/0270720 A1* | 10/2008 | Tanabe et al. ............ 711/162 |
| 2011/0185135 A1 | 7/2011 | Fujii et al. |

FOREIGN PATENT DOCUMENTS

| | | |
|---|---|---|
| JP | 2005-031929 A | 2/2005 |
| JP | 2005-038071 A | 2/2005 |
| JP | 2007-241593 | 3/2006 |

* cited by examiner

FIG. 4

| RAID GROUP ID | OVERALL CAPACITY | USED CAPACITY | UNUSED CAPACITY | DISK CLASSIFIC-ATION | RAID TYPE | DISK NUMBER |
|---|---|---|---|---|---|---|
| RG1 | 300G | 100G | 200G | FC | RAID5 | 4 |
| RG2 | 200G | 50G | 150G | FC | RAID5 | 4 |
| RG3 | 300G | 150G | 150G | SATA | RAID6 | 6 |

FIG. 5

| POOL ID | OVERALL CAPACITY | ALLOCATED CAPACITY | THRESHOLD VALUE |
|---|---|---|---|
| P1 | 100G | 20G | 90% |
| P2 | 100G | 20G | 90% |
| P3 | 200G | 80G | 90% |

FIG. 6

| VIRTUAL VOLUME ID | VIRTUAL POOL ID | VIRTUAL CAPACITY | REAL ALLOCATED CAPACITY |
|---|---|---|---|
| V1 | P1 | 1T | 10G |
| V2 | P1 | 1T | 10G |

FIG. 7

| VIRTUAL POOL ID | VIRTUAL POOL VOLUME | CHUNK ID | ALLOCATION LBA | ALLOCATION STATUS |
|---|---|---|---|---|
| P1 | V100 | C11 | 0G - 2G | ALLOCATED (V1) |
| P1 | V100 | C12 | 2G - 4G | ALLOCATED (V1) |
| P1 | V101 | C13 | 0G - 2G | ALLOCATED (V2) |
| P1 | V101 | C14 | 2G - 4G | ALLOCATED (V1) |
| P1 | V101 | C15 | 4G - 6G | UNALLOCATED |

FIG. 12

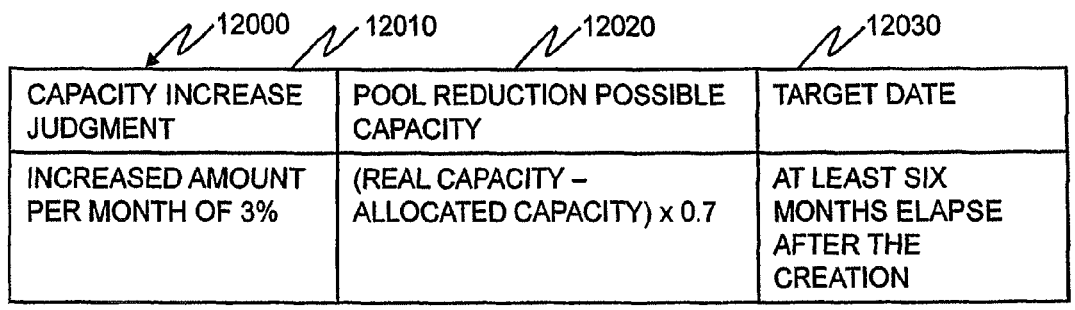

| CAPACITY INCREASE JUDGMENT | POOL REDUCTION POSSIBLE CAPACITY | TARGET DATE |
|---|---|---|
| INCREASED AMOUNT PER MONTH OF 3% | (REAL CAPACITY − ALLOCATED CAPACITY) x 0.7 | AT LEAST SIX MONTHS ELAPSE AFTER THE CREATION |

FIG. 13

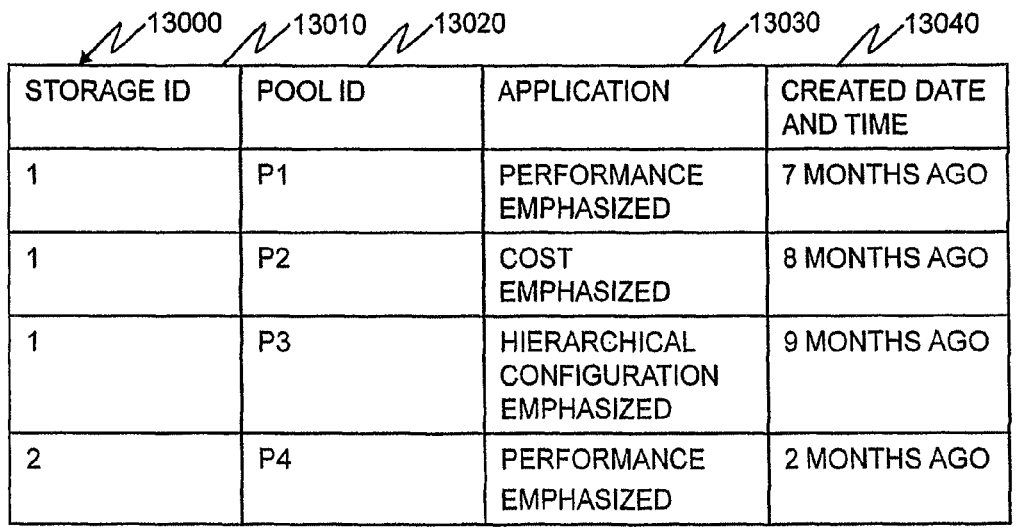

| STORAGE ID | POOL ID | APPLICATION | CREATED DATE AND TIME |
|---|---|---|---|
| 1 | P1 | PERFORMANCE EMPHASIZED | 7 MONTHS AGO |
| 1 | P2 | COST EMPHASIZED | 8 MONTHS AGO |
| 1 | P3 | HIERARCHICAL CONFIGURATION EMPHASIZED | 9 MONTHS AGO |
| 2 | P4 | PERFORMANCE EMPHASIZED | 2 MONTHS AGO |

FIG. 14

POOL CONFIGURATION (14000)

| CAPACITY (14100) | APPLICATION (14110) | NUMBER OF POOLS (14120) |
|---|---|---|
| 100G | PERFORMANCE EMPHASIZED | 1 |
| 100G | COST EMPHASIZED | 1 |

[ADDITION] (14200)  [CONFIGURATION] (14300)  [CANCEL] (14400)

FIG. 15

STORAGE CAPACITY REPORT (15000)

| ITEM (15100) | SELECTION (15110) |
|---|---|
| STORAGE | ☐ |
| RAID GROUP | ☐ |

[OUTPUT] (15300)  [CANCEL] (15400)

FIG. 16

STORAGE CAPACITY REPORT (16000)

| STORAGE ID | OVERALL CAPACITY | USED CAPACITY | UNUSED CAPACITY |
|---|---|---|---|
| 1 | 800 | 200G | 600G |
| 2 | 500G | 300G | 200G |

| STORAGE ID | RAID GROUP ID | OVERALL CAPACITY | USED CAPACITY | UNUSED CAPACITY |
|---|---|---|---|---|
| 1 | RG1 | 300G | 100G | 200G |
| 1 | RG2 | 200G | 50G | 150G |
| 1 | RG3 | 300G | 100G | 200G |
| 2 | RG4 | 500G | 300G | 200G |

FIG. 19

STORAGE CAPACITY REPORT (26000)

| STORAGE ID (16100) | OVERALL CAPACITY (16110) | USED CAPACITY (16120) | UNUSED CAPACITY (16130) | CAPACITY THAT IS DELETED FROM A POOL (16140) (19000) |
|---|---|---|---|---|
| 1 | 800 | 200G | 600G | 50G |
| 2 | 500G | 300G | 200G | 0G |

| STORAGE ID (16200) | RAID GROUP ID (16210) | OVERALL CAPACITY (16220) | USED CAPACITY (16230) | UNUSED CAPACITY (16240) | CAPACITY THAT IS DELETED FROM A POOL (16250) (19100) |
|---|---|---|---|---|---|
| 1 | RG1 | 300G | 100G | 200G | 0G |
| 1 | RG2 | 200G | 50G | 150G | 0G |
| 1 | RG3 | 300G | 100G | 200G | 50G |
| 2 | RG4 | 500G | 300G | 200G | 0G |

COMPUTER AND METHOD FOR MANAGING STORAGE APPARATUS

CROSS-REFERENCE TO PRIOR APPLICATION

This application is a Continuation application of U.S. application Ser. No. 12/453,807 filed on May 22, 2009 and issued as U.S. Pat. No. 8,209,484 on Jun. 26, 2012. Priority is claimed based on U.S. application Ser. No. 12/453,807 filed May 22, 2009, which claims priority to Japanese Patent Application Number 2009-59886, filed on Mar. 12, 2009, the entire disclosure of which is incorporated herein by reference.

BACKGROUND

Field of the Invention

The present invention generally relates to management of a storage apparatus.

As an example of a logical volume, there is a virtual volume as disclosed in Document 1. The virtual volume is provided with a plurality of address ranges. In the case in which an address range is a write destination, a physical area (a physical storage area) is allocated from a pool to the address range, and a write target data is written to the allocated physical area. As a result, a real storage capacity of the virtual volume is dynamically extended. In the case in which an allocation to an address range of the allocated physical area is canceled, the physical area becomes an unused physical area.

An amount of change per unit time for a used capacity of a pool (the total storage capacity of the allocated physical area) is dynamically different depending on a trend of an access to a virtual volume. Consequently, a certain amount of extra storage capacity is ensured for a pool.

However, depending on a trend of an access, a used capacity of a pool is not increased so much, and therefore, a storage capacity ensured for a pool includes a useless storage capacity in some cases.

For instance, Document 2 discloses a technique in which a trend of an increase for a used capacity of a pool is figured out corresponding to a request for creating a volume and a storage capacity that was judged as being useless at some point in time is used as a capacity of a volume to be created.

[Document 1] Japanese Patent Application Laid-Open Publication No. 2003-15915

[Document 2] Japanese Patent Application Laid-Open Publication No. 2007-241593

SUMMARY

A storage capacity that is uselessly ensured can be reduced by deleting a physical area for an excess storage capacity from a pool. However, that operation may cause an unfavorable thing to occur with a viewpoint of the input/output for a storage apparatus.

Such a problem may occur for not only a pool that stores data to a virtual volume but also other kinds of pools (such as a pool that stores the differential information or journal information of a volume of a copy source).

An object of the present invention is to support so as to change the configuration of the storage apparatus while preferably maintaining the input/output for the storage apparatus.

A storage resource in a management computer coupled to a storage apparatus stores pool management information. The pool management information includes pool application information that indicates a pool application for a pool and application condition information that indicates conditions for the pool application. The pool is provided with at least one real volume based on a RAID (Redundant Array of Independent (or Inexpensive) Disks) group. A processor in the management computer carries out the following processes (A) to (D):

(A) calculating an excess storage capacity based on a pool usage status for the pool;

(B) specifying a pool application for the pool and conditions for the pool application based on the pool management information;

(C) judging whether the specified conditions are satisfied even in the case in which a storage area having a storage capacity equivalent to or less than the calculated excess storage capacity is deleted from the pool; and (D) defining a capacity equivalent to or less than the excess storage capacity as an unused capacity in the case in which the result of the judgment in the above (C) is positive.

The processor outputs a storage capacity report including the information that indicates an unused capacity of the storage apparatus for instance. The unused capacity is a sum total (or a capacity based on the sum total) of an unused capacity for the RAID group and the capacity defined as an unused capacity in the above (D) (a capacity equivalent to or less than the excess storage capacity) for instance.

The above described "unused capacity for the RAID group" is a capacity of a storage area to which a logical volume is not defined. More specifically, while the whole or a part of a storage space based on the RAID group can be defined as a logical volume, a storage space part that is not defined as a logical volume in the storage space is an unused part for the RAID group, and a capacity of the storage space part is the unused capacity for the RAID group.

On the other hand, the unused capacity for the pool is the total amount of at least one physical area that is not allocated to a virtual volume in a plurality of physical areas included in the pool. An unused capacity for the pool is figured out from a pool usage status, and an excess storage capacity is calculated based on the unused capacity.

BRIEF DESCRIPTION OF THE DRAWINGS

FIG. 4 shows a RAID group table 4000.

FIG. 5 shows a pool capacity table 5000.

FIG. 6 shows a virtual volume table 6000.

FIG. 7 shows a pool allocation table 7000.

FIG. 12 shows a pool capacity increase judgment table 12000.

FIG. 13 shows a pool application table 13000.

FIG. 14 shows a pool configuration screen 14000.

FIG. 15 shows a capacity report output indication screen 15000.

FIG. 16 shows a capacity report screen 16000 in accordance with a first embodiment of the present invention.

FIG. 19 shows a capacity report screen 26000 in accordance with a second embodiment of the present invention.

DETAILED DESCRIPTION

Some embodiments in accordance with the present invention will be described below in detail with reference to the drawings. In the following descriptions, the processes that are executed by a computer program are practically executed by a processor that executes the computer program.

[Embodiment 1]

Figure 1:
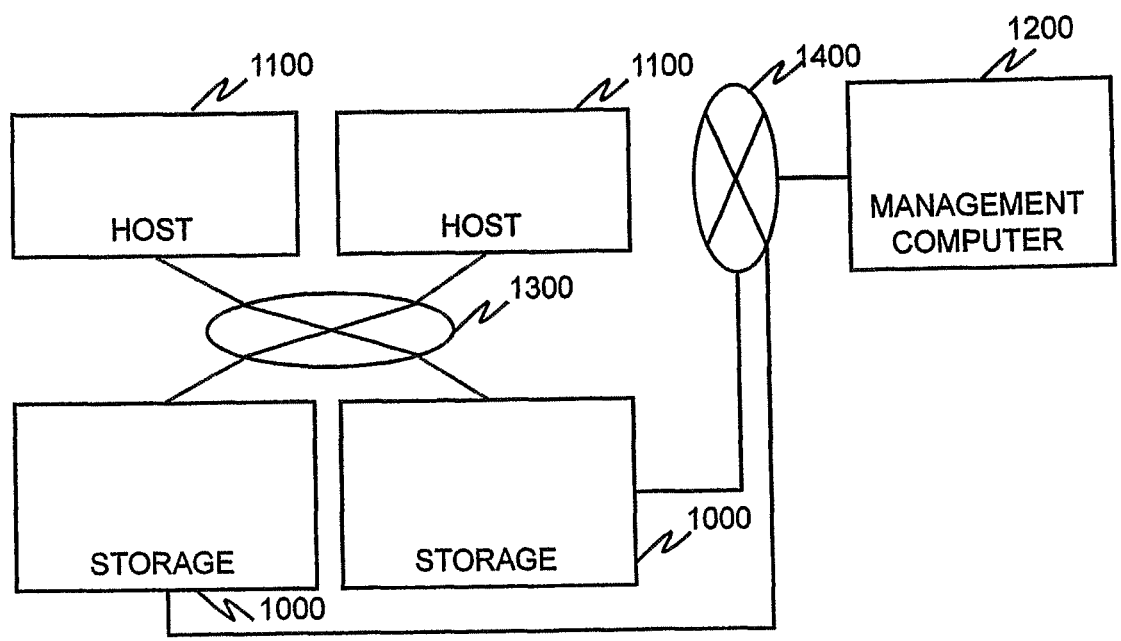
FIG. 1 shows a configuration of a computer system in accordance with a first embodiment of the present invention.

FIG. 1 shows a configuration of a computer system in accordance with a first embodiment of the present invention.

A plurality of host computers (or a host computer) (hereafter referred to as a host) 1100 is coupled to a plurality of storage apparatuses (or a storage apparatus) (hereafter referred to as a storage) 1000 via a data network 1300. Each storage 1000 receives an input/output request (I/O request) from a host 1100 via a data network 1300. The I/O request is a write request or a read request that specifies a logical volume that is managed by the storage apparatus 1000 for instance. An external apparatus for each storage 1000 can be an external storage 1000 in place of the host 1100.

An access from the host 1100 to the storage 1000 is an access at a block level for instance. Consequently, the data network 1300 can be an FC (Fibre Channel) network Most commonly. However, the data network 1300 is not restricted to the FC network, and can be a TCP/IP network that enables iSCSI to pass through. Moreover, the storage 1000 can be included in the host 1100. More specifically, the data network 1300 can be an internal bus of the host 1100, and the host 1100 can achieve a function of the storage 1000. As this case, a NAS (Network Attached Storage) can be adopted for instance.

A management computer 1200 is coupled to each storage 1000 via a management network 1400. The management computer 1200 obtains information that is managed by the storage 1000 (for instance, the storage configuration information 1042 described later (see FIG. 2)) from the storage 1000 via the management network 1400. The storage 1000 can also transmit the management information to the management computer 1200 voluntarily (without receiving any request from the management computer 1200 for instance).

The management network 1400 can be any kind of network providing the management information can be obtained. Each host 1100 can be coupled to the management network 1400. In this case, the management computer 1200 can communicate with each host 1100. A first management network that couples the management computer 1200 with the host 1100 and a second management network that couples the management computer 1200 with the storage 1000 can be separate networks. For instance, the first management network can be a TCP/IP network, and the second management network can be an FC network.

Figure 2:
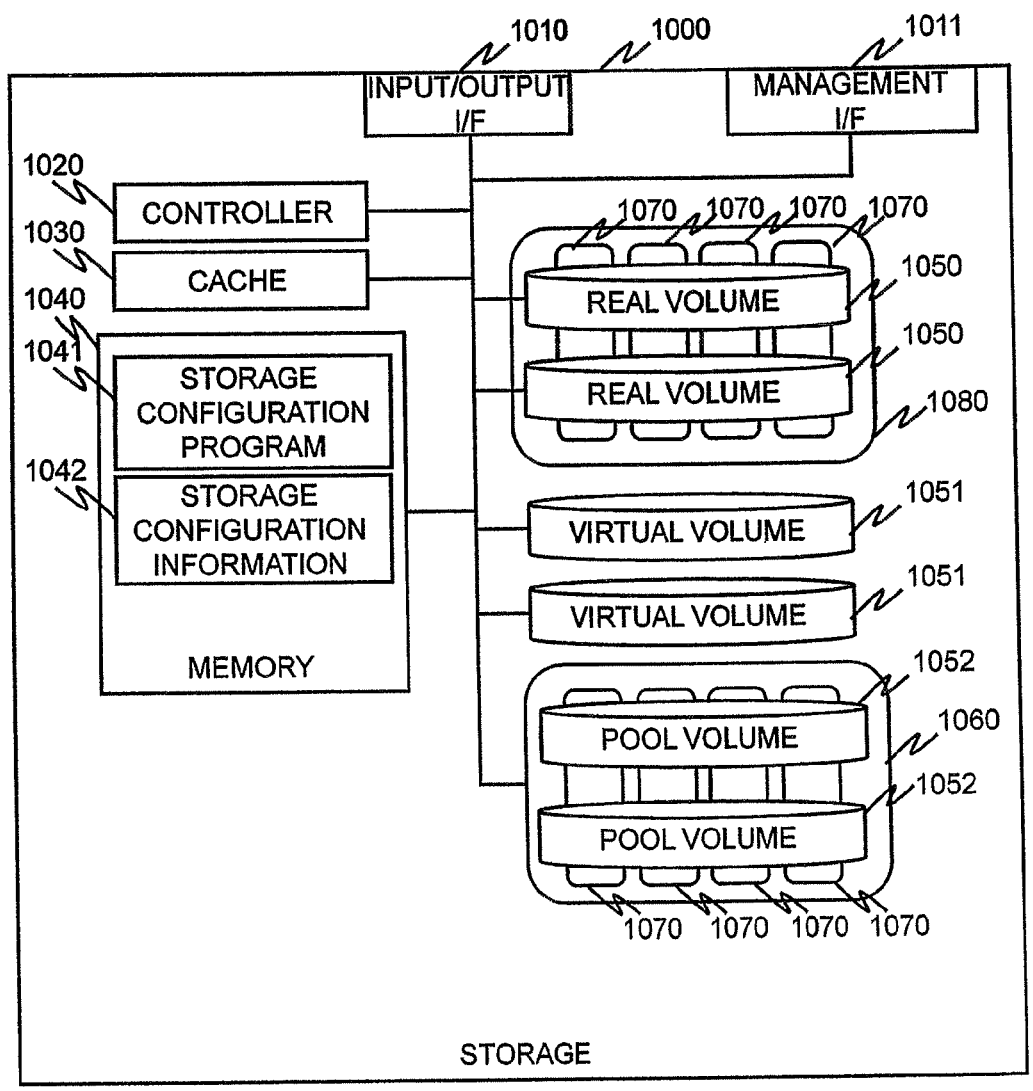
FIG. 2 shows a configuration of a storage 1000.

FIG. 2 shows a configuration of a storage 1000.

The storage 1000 is provided with the following components:

an interface device (an input/output I/F) 1010 that is coupled with the data network 1300 and that receives an I/O request from the host 1100;

an interface device (a management I/F) 1011 that is coupled with the management network 1400 and that receives many kinds of requests from the management computer 1200;

a controller (such as a microprocessor or a circuit board provided with a microprocessor) 1020 that controls the operation of the storage 1000;

a cache memory (hereafter referred to as a cache) 1030 that is coupled to the controller 1020 and that is used for improving the performance of the storage 1000 (for instance, temporarily stores data that is written to a logical volume);

a memory 1040 that is coupled to the controller 1020; and a plurality of RAID groups (or a RAID group) 1080 that is coupled to the controller 1020.

The RAID group 1080 is a group composed of at least two hard disks 1070 for storing data at a prescribed RAID level. As substitute for the hard disk 1070, other kinds of storage medium such as a flash memory can also be adopted.

A logical volume that is created based on a storage space of the RAID group 1080 is a real volume 1050. The real volume 1050 can be a pool volume 1052 that is a logical volume that is not provided to the host 1100, or can also be a normal logical volume that is provided to the host 1100. The RAID group 1080 can also be included in an external storage 1000, and the storage 1000 shown in FIG. 2 can be provided with the real volume 1050 (for instance, a pool volume or a normal logical volume) based on the RAID group 1080 of the external storage 1000.

A pool 1060 is managed in the storage 1000. The pool 1060 is provided with a pool volume (or a plurality of pool volumes) 1052. Each pool volume 1052 is composed of a plurality of physical areas. Consequently, the pool 1060 is provided with many physical areas. Each physical area has the equivalent size to each other for instance.

A virtual volume 1051 is managed in the storage 1000. The virtual volume 1051 is a kind of logical volumes that are provided to the host 1100 (that is, a normal logical volume) and is a logical volume that is not based on the RAID group 1080. The virtual volume 1051 is provided with a plurality of address ranges (in other words, virtual areas). One of physical areas of a pool is allocated to each address range.

The memory 1040 stores a storage configuration program 1041 and the storage configuration information 1042. The storage configuration program 1041 is executed by the controller 1020. The storage configuration information 1042 is the information that is referred to by the storage configuration program 1041 and is the management information related to the configuration of the storage 1000. The information 1042 can also be managed by a memory 1230 of the management computer 1200 (see FIG. 3).

The storage configuration program 1041 is a program that manages the configuration of the storage 1000. The storage configuration program 1041 is provided with the following functions:

a function for creating the real volume 1050, the virtual volume 1051, the pool volume 1052, and the pool 1060;

a function for allocating a physical area in the pool 1060 to the virtual volume 1051;

a function for providing the real volume 1050 and the virtual volume 1051 to the host 1100 via the input/output I/F 1010; and a function for carrying out a data migration between the real volume 1050 and the virtual volume 1051.

The real volume 1050 and the pool volume 1052 described above can also be logical volumes based on the hard disk 1070 itself as substitute for the RAID group 1080.

Figure 3:
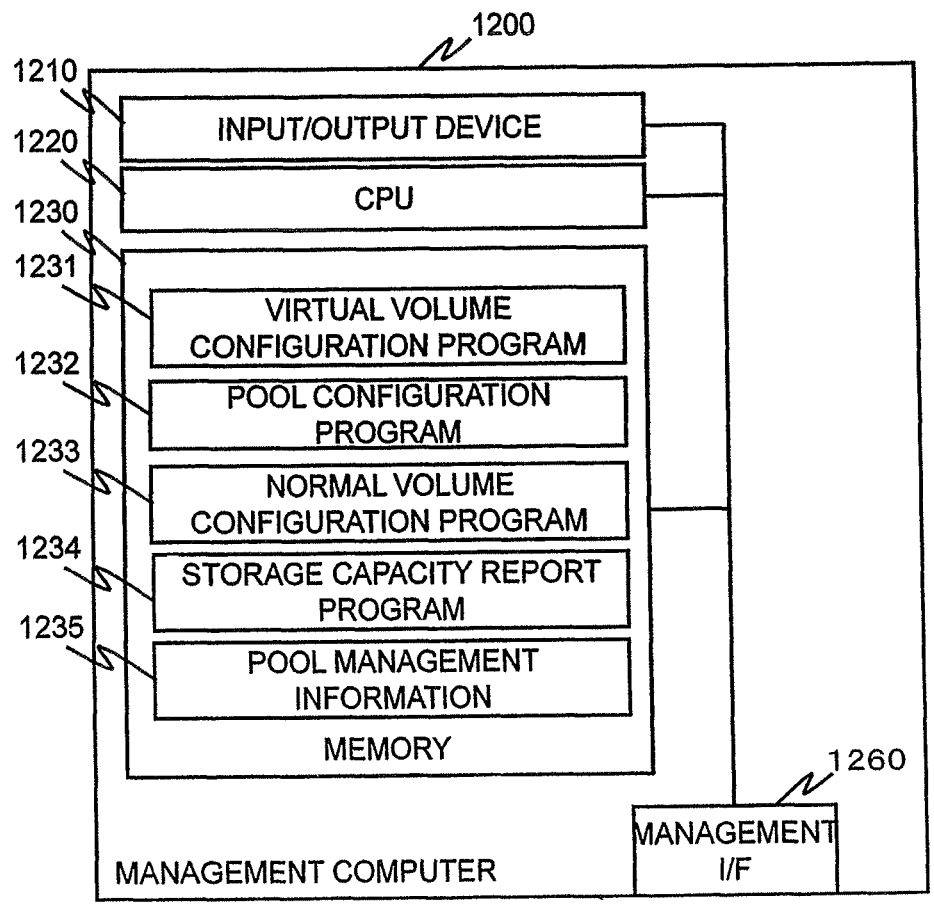
FIG. 3 shows a configuration of a management computer 1200.

FIG. 3 shows a configuration of a management computer 1200.

The management computer 1200 is provided with an input/output device 1210, a CPU (Central Processing Unit) 1220, a memory 1230, and a management I/F 1260.

The management I/F 1260 is an interface device that is coupled with the management network 1400. The management computer 1200 communicates with the storage 1000 (and the host 1100) via the management I/F 1260.

The input/output device 1210 is provided with an input device (such as a keyboard, a pointing device, and a microphone) and an output device (such as a display device, a printer, and a speaker).

The memory 1230 stores a virtual volume configuration program 1231 for configuring a virtual volume, a pool configuration program 1232 for configuring a pool, a normal volume configuration program 1233 for configuring a normal volume, a capacity report program 1234 for outputting a capacity report, and the pool management information 1235. The computer programs 1231 to 1234 are executed by the CPU 1220. The pool management information 1235 is management information related to the pool 1060.

Figure 8:
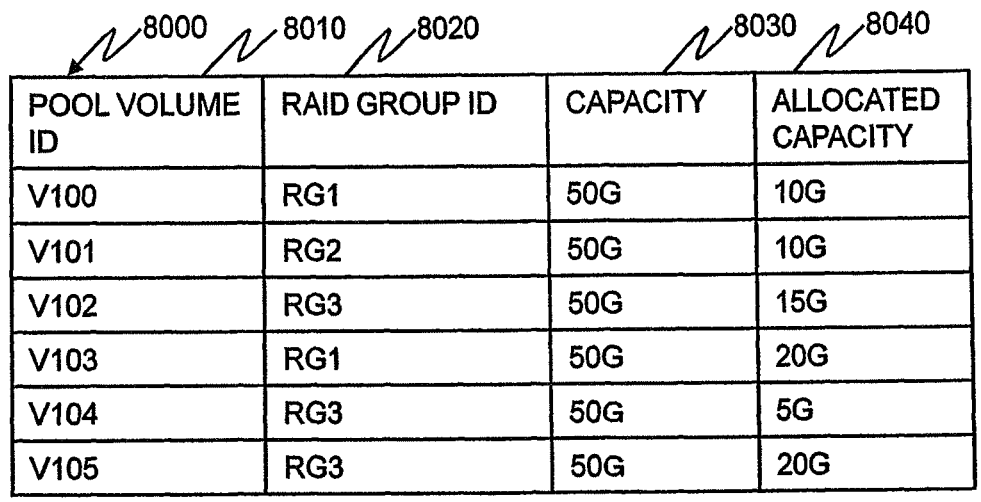
FIG. 8 shows a pool volume table 8000.
Figure 9:
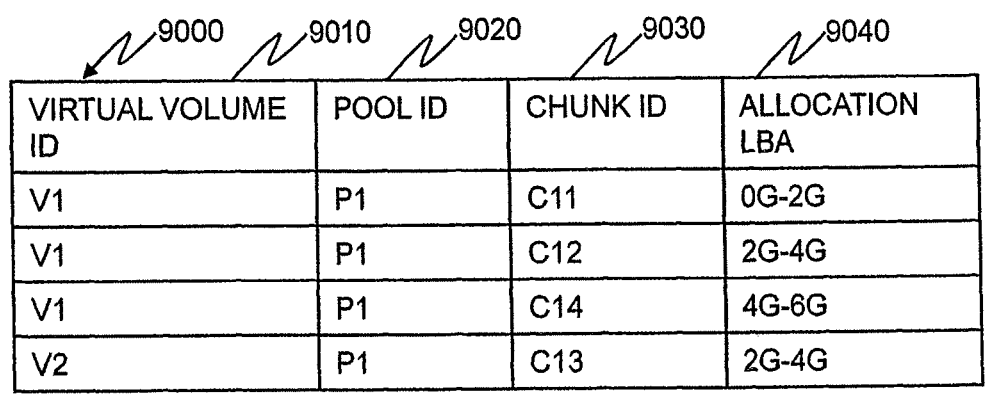
FIG. 9 shows a virtual volume allocation table 9000.
Figure 10:
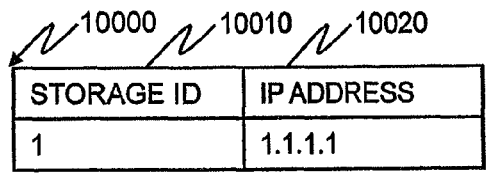
FIG. 10 shows a storage identification table 10000.

The storage configuration information 1042 in the storage 1000 includes the following tables:
a RAID group table 4000 shown in FIG. 4;
a pool capacity table 5000 shown in FIG. 5;
a virtual volume table 6000 shown in FIG. 6;
a pool allocation table 7000 shown in FIG. 7;
a pool volume table 8000 shown in FIG. 8;
a virtual volume allocation table 9000 shown in FIG. 9; and
a storage identification table 10000 shown in FIG. 10.
These tables will be described below. In the following descriptions, a unit of a storage capacity is a byte unless otherwise specified in particular. For instance, in the case in which "10 G" is written as a storage capacity in a table, the storage capacity is 10 G bytes (giga bytes).

FIG. 4 shows a RAID group table 4000.

The RAID group table 4000 includes the following information elements for every RAID group:
a RAID group ID 4010 that is an identifier of the RAID group;
an overall capacity 4020 that indicates a storage capacity of the RAID group (hereafter referred to as an overall capacity);
a used capacity 4030 that indicates a used capacity in the overall capacity of the RAID group;
an unused capacity 4040 that indicates an unused capacity in the overall capacity of the RAID group;
a disk classification 4050 that indicates a classification of the hard disk 1070 that configures the RAID group;
a RAID type 4060 that indicates a type of the RAID configuration (RAID level); and
a disk number 4070 that indicates the number of the hard disks 1070 that configure the RAID group.

Here, the used capacity of the RAID group is a capacity of the storage space part that is used for the logical volume among the storage space based on the RAID group. On the other hand, the unused capacity of the RAID group is a capacity of the storage space part that is not used for the logical volume among the storage space based on the RAID group (in other words, a storage capacity that can be obtained by subtracting a used capacity from the overall capacity).

FIG. 5 shows a pool capacity table 5000.

The pool capacity table 5000 includes the following information elements for every pool:
a pool ID 5010 that is an identifier of the pool 1060;
an overall capacity 5020 that indicates a storage capacity (an overall capacity) of the pool 1060;
an allocated capacity 5030 that indicates a total storage capacity of a physical area that is allocated to the virtual volume 1051 from the pool 1060; and
a threshold value 5040 that indicates a threshold value of the allocated capacity.

The threshold value 5040 is a rate of an allocated capacity to a virtual capacity (a storage capacity of a virtual volume) and is indicated by a percentage for instance. The information for making a decision to increase an overall capacity of a pool is that a rate of an allocated capacity to a virtual capacity exceeds the threshold value 5040. In the case in which a rate of an allocated capacity to a virtual capacity exceeds the threshold value 5040, the storage 1000 can control that a physical area is not allocated to the virtual volume 1051. The threshold value 5040 can be configured by a user, and can also be configured automatically by the storage configuration program 1041 corresponding to an overall capacity of a pool. Moreover, the threshold value 5040 can be indicated by a storage capacity as substitute for a percentage.

FIG. 6 shows a virtual volume table 6000.

The virtual volume table 6000 includes the following information elements for every virtual volume:
a virtual volume ID 6010 that is an identifier of the virtual volume 1051;
a pool ID 6020 that indicates an identifier of the pool 1060 corresponded to the virtual volume 1051 (a pool of a providing source of a physical area that is allocated to the virtual volume 1051);
a virtual capacity 6030 that is a storage capacity (a virtual capacity) of the virtual volume 1051 and that indicates a storage capacity that is identified by the host 1100; and
a real allocated capacity 6040 that indicates a total storage capacity of a physical area that has been allocated to the virtual volume 1051.

As described above, the real allocated capacity of the virtual volume 1051 is increased corresponding to a write request from the host 1100 to the virtual volume 1051. To make the host 1100 identify the virtual volume 1051, the information such as a LUN (logical unit number) and a port ID of an SCSI can be utilized for each virtual volume 1051. In this case, the LUN and the port ID can be registered to the virtual volume table 6000.

In the configuration of the virtual volume 1051, the virtual volume configuration program 1231 specifies the pool ID and the virtual capacity to the storage 1000 as a parameter of a configuration. The storage configuration program 1041 configures a virtual volume that has a specified virtual capacity and that is made to correspond to a pool that is identified by a specified pool ID. The pool ID and the virtual capacity (parameter) can also be configured automatically by the storage 1000 as substitute for being specified and configured by a user.

The table 6000 shown in FIG. 6 lists only information related to the virtual volume that is made to correspond to a pool P1. However, information related to a virtual volume that is made to correspond to a pool P2 and information related to a virtual volume that is made to correspond to a pool P3 are also registered in practice.

FIG. 7 shows a pool allocation table 7000.

The pool allocation table 7000 includes the following information elements for every pool:
a pool ID 7010 that indicates an identifier of the pool 1060;
a pool volume ID 7020 that indicates an identifier of the pool volume 1052 included in the pool 1060;
a chunk ID 7030 that indicates an identifier of a chunk that is a physical area;
an allocation LBA 7040 that indicates a range of an LBA (Logical Block Address) occupied by the chunk; and
an allocation status 7050 that indicates whether the chunk is allocated or not.

As a value of the allocation status 7050, there are "allocated" having a meaning that the chunk has been allocated and "unallocated" having a meaning that the chunk is not allocated for instance. In the case in which the value is "allocated", an ID of a virtual volume of an allocated destination is included in the value. For instance, in the table 7000, a chunk of a chunk ID C11 is a physical area of 2 G bytes from a base point of an address at 0 GB from the start of a pool volume V100 in the pool P1 to an end point of an address at 2 GB from the start of the pool volume V100, and has been allocated to the virtual volume V1.

The overall capacity 5020 for a pool is a total storage capacity of a chunk included in the pool. The allocated capacity 5030 for a pool is a total storage capacity of a chunk that has been allocated from the pool 1060.

The table 7000 lists only a part of chunks of the pool P1. However, all chunks of all pools are managed similarly in a practical sense.

FIG. 8 shows a pool volume table 8000.

The pool volume table 8000 includes the following information elements for every pool volume:
a pool volume ID 8010 that indicates an identifier of the pool volume 1052;
a RAID group ID 8020 that indicates an identifier of a RAID group 1080 that is a base of the pool volume 1052;
a capacity 8030 that indicates a capacity of the pool volume 1052; and
an allocated capacity 8040 that indicates a total storage capacity of a chunk that has been allocated to the virtual volume from the pool volume 1052.

FIG. 9 shows a virtual volume allocation table 9000.

The virtual volume allocation table 9000 includes the following information elements for every virtual volume:
a virtual volume ID 9010 that indicates an identifier of the virtual volume 1051;
a pool ID 9020 that indicates an identifier of the pool 1060 made to correspond to the virtual volume 1051;
a chunk ID 9030 that indicates an identifier of a chunk that is allocated; and
an allocation LBA 9040 that indicates an address range to which a chunk is allocated among a plurality of address ranges included in the virtual volume 1051.

In the table 9000, a chunk C13 is allocated to an address range of 2 G bytes from a base point of an address at 2 GB from the start to an end point of an address at 4 GB from the start among a plurality of address ranges included in the virtual volume V2.

The table 9000 lists only information of a part of address ranges of the virtual volumes V1 and V2. However, other address ranges are managed similarly in a practical sense.

An I/O process that is executed from the host to the virtual volume in accordance with the embodiment of the present invention will be described below.

At first, a process that is executed by the storage 1000 that has received a write request to the virtual volume 1051 will be described below.

In the case in which a write request to the virtual volume 1051 has not been executed, a chunk has not been allocated to the virtual volume 1051. However, a chunk can also be allocated to a part of address ranges of the virtual volume 1051 right from the beginning for any reason.

The controller 1020 receives a write request in which an address range of the virtual volume 1051 is specified. The controller 1020 confirms whether a chunk is allocated to the specified address range or not. In the case in which a chunk is allocated, the controller 1020 stores the write target data into the allocated chunk.

On the other hand, in the case in which a chunk is not allocated to the specified address range, the controller 1020 allocates a chunk that has not been allocated to any address range of the virtual volume 1051 (an unallocated chunk) to the specified address range, and the controller 1020 stores the data into the chunk. Moreover, the controller 1020 updates the storage configuration information (the pool table 8000) based on the new allocation.

In the next place, a process that is executed by the storage 1000 that has received a read request to the virtual volume 1051 will be described below.

The controller 1020 receives a read request in which an address range of the virtual volume 1051 is specified. The controller 1020 confirms whether a chunk of the pool 1060 is allocated to the specified address range or not. In the case in which the chunk is allocated, the controller 1020 reads data from the allocated chunk and returns the data to the host 1100.

On the other hand, in the case in which a chunk is not allocated to the specified address range, the controller 1020 returns the prescribed data (such as "0") corresponding to a data amount of the specified address range to the host 1100.

FIG. 10 shows a storage identification table 10000.

The storage identification table 10000 includes a storage ID 10010 that is an identifier of the storage 1000 and an IP address 10020 that is information being used to access to the storage 1000 via the management network 1400 by the management computer 1200. A plurality of IP addresses 10020 can be registered.

The storage configuration information 1042 has been described above.

In the next place, the pool management information 1235 included in the management computer 1200 will be described below.

Figure 11:
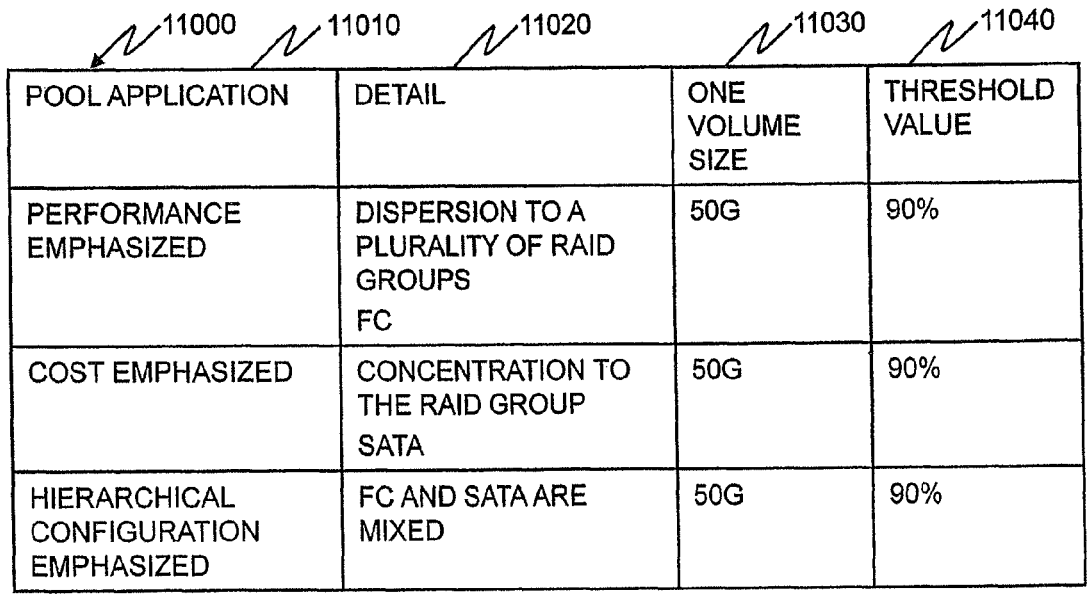
FIG. 11 shows a pool configuration table 11000.

The pool management information 1235 includes the following tables:
a pool configuration table 11000 shown in FIG. 11;
a pool capacity increase judgment table 12000 shown in FIG. 12; and
a pool application table 13000 shown in FIG. 13.
These tables will be described below.

FIG. 11 shows a pool configuration table 11000. The table 11000 can be configured for the management computer 1200 in advance, and can be configured or modified as needed by a user.

The pool configuration table 11000 includes the following information elements for every pool application:
a pool application 11010 that indicates an application of the pool;
a detail 11020 that indicates a condition related to the pool application; one volume size 11030 that indicates a size of one pool volume; and
a threshold value 11040 that indicates a threshold value of a rate of a used capacity to the overall capacity of the pool.

As a value of the pool application 11010, there are "performance emphasized" that means giving priority to a higher I/O performance (I/O performance to a virtual volume) over a lower bit cost (a cost per bit), "cost emphasized" that means giving priority to a lower bit cost over a higher I/O performance, and "hierarchical configuration emphasized" that means that the plural kinds of pool volumes are mixed.

The condition related to the pool application is based on the number of RAID groups that are a basis of a pool and/or a kind of a pool volume. More specifically, the condition related to the pool application is based on the following definitions (1) to (3) according to the table 11000:
(1) For a pool corresponding to the pool application "performance emphasized", a plurality of pool volumes is based on separate RAID groups, all pool volumes are FC (Fibre Channel) pool volumes, and each FC pool volume is 50 G bytes;

(2) For a pool corresponding to the pool application "cost emphasized", a plurality of pool volumes is based on a single RAID group, all pool volumes are SATA (Serial ATA (Advanced Technology Attachment)) pool volumes, and each SATA pool volume is 50 G bytes;

(3) A pool corresponding to the pool application "hierarchical configuration emphasized" has a configuration in which the FC pool volume and the SATA pool volume are mixed. Here, "the FC pool volume" is a logical volume that is based on the RAID group and that is composed of the FC hard disks, and "the SATA pool volume" is a logical volume that is based on the RAID group and that is composed of the SATA hard disks. The kinds of hard disks are different from each other depending on an interface such as FC and SATA. As substitute for, or in addition to this, the kinds of hard disks may be different from each other from a viewpoint of other kinds such as a manufacturer and a storage medium.

FIG. 12 shows a pool capacity increase judgment table 12000.

The pool capacity increase judgment table 12000 includes the following information elements:

a capacity increase judgment 12010 that indicates a method for judging whether an increasing trend of a used capacity (hereafter referred to as a capacity increase trend) of a pool is low or not (hereafter referred to as a capacity increase judgment);

a pool reduction possible capacity 12020 that indicates a method for calculating an excess storage capacity of a pool; and a target date 12030 that indicates a condition for being a target of a capacity increase judgment (more specifically, a period that elapses from the creation for the pool).

For an example of the table 12000 shown in FIG. 12, as a method for a capacity increase judgment, a criterion is that an increased amount per month is at least an average of 3%. In the case in which an increased amount per month is less than an average of 3%, it is judged that a capacity increasing trend is low. In the case in which it is judged that a capacity increasing trend is low, an excess storage capacity of the pool is calculated. The target date 12030 indicates that "at least six months elapse after the creation". For more detailed values, in the case in which a capacity of a pool is 1 T bytes (terabyte), six months elapsed after the creation of the pool, and an increased amount of a used capacity of the pool is 120 G, it is found that an average increased amount is 20 G in a month and 20 G is 2% as an increase. In this case, it is judged that an increased amount of a used capacity of the pool is less, that is to say, a capacity increasing trend is low.

FIG. 13 shows a pool application table 13000.

The pool application table 13000 includes the following information elements for every pool:

a storage ID 13010 that is an identifier of the storage 1000 provided with a pool;

a pool ID 13020 that is an identifier of a pool;

a pool application 13030 that indicates an application of a pool; and a created date and time 13040 that indicates a date and time of creation of a pool.

The storage ID 13010 can be an ID of the storage 1000 which is identified by the management computer 1200. In this case, for the storage 1000 provided with no pool, an invalid value (such as "-" (hyphen)) can be registered to the pool ID 13020, the pool application 13030, and the created date and time 13040 to manage that the storage 1000 provided with no pool is identified. In the case in which the information such as an IP address for accessing the storage 1000 is required, the information can be added to the table 13000 or can be managed in other tables. In the case in which the storage ID 13010 is an IP address, it is not necessary to add a column for an IP address to the table 13000.

FIG. 14 shows a pool configuration screen 14000.

The screen 14000 is displayed on a display device (a part of the input/output device 1210) by the pool configuration program 1232. The screen 14000 is a screen for a user to configure a pool.

The screen 14000 is provided with a column 14100 for configuring an overall capacity of a pool, a column 14110 for configuring a pool application, and a column 14120 for configuring the number of pools provided with each application. In addition, the screen 14000 is provided with a button 14200 that is pressed in the case in which a pool application is added, a button 14300 for applying a condition configured in each column to the pool management information 1235, and a button 14400 that is used in the case in which the configuration of the screen is canceled.

FIG. 15 shows a capacity report output indication screen 15000.

The screen 15000 is displayed on a display device by the capacity report program 1234. The screen 15000 is a screen for a user to execute an indication of an output of a report related to a storage capacity of the storage 1000 (hereafter referred to as a capacity report).

The screen 15000 is provided with a column 15100 in which an item of the capacity report is displayed and a column 15110 provided with a check box. A user enters a check mark in a check box corresponding to a desired item. The item "storage" means that a storage capacity is reported in a storage unit and the item "RAID group" means that a storage capacity is reported in a RAID group unit. As an item of a capacity report, there can be a storage ID and/or a RAID group ID as substitute for or in addition to the storage and/or the RAID group. In other words, a capacity report for a storage or a RAID group that is desired by a user can be executed as substitute for carrying out a capacity report for all storages or all RAID groups.

Moreover, the screen 15000 is provided with a button 15300 for applying a condition configured in each column to the management computer 1200 and a button 15400 that is used in the case in which the configuration of the screen is canceled.

FIG. 16 shows a capacity report screen 16000.

The screen 16000 is displayed on a display device by the capacity report program 1234. The screen 16000 is a screen for displaying a capacity report for each item that is selected in FIG. 15.

For instance, a storage capacity report 16100 is displayed in the case in which the item "storage" is selected in the screen 15000 shown in FIG. 15, and a RAID group capacity report 16200 is displayed in the case in which the item "RAID group" is selected in the screen 15000 shown in FIG. 15. In the case in which the both items "storage" and "RAID group" are selected in the screen 15000 shown, both of the storage capacity report 16100 and the RAID group capacity report 16200 are displayed.

The storage capacity report 16100 is provided with the following information elements for every storage that can be accessed by the management computer 1200:

a storage ID 16110 that is an identifier of the storage;

an overall capacity 16120 that indicates an overall capacity of the storage;

a used capacity 16130 that indicates a capacity that has been defined as a logical volume for the storage; and an unused capacity 16140 that indicates a capacity that can be used as a used capacity in the next place for the storage.

The RAID group capacity report 16200 is provided with the following information elements for every RAID group:

a storage ID 16210 that is an identifier of the storage;

a RAID group ID 16220 that displays an identifier of the RAID group;

an overall capacity 16230 that indicates an overall capacity of the RAID group;

a used capacity 16240 that indicates a capacity that has been defined as a logical volume for the RAID group; and an unused capacity 16250 that indicates a capacity that can be used as a used capacity in the next place for the RAID group.

With the screen 16000, the unused capacities of a plurality of storages (and a plurality of RAID groups) can be figured out in an integrated fashion. For instance, a user can use a capacity report that is displayed in the screen 16000 as information for creating a volume (such as a pool volume or a normal volume in which an increase in a capacity is not considered in particular by an archive or the like). Moreover, by storing a capacity report that is obtained at each point as a history, a trend of an unused capacity (and a used capacity) can be figured out and it can be expected that the capacity report is used for many things.

Figure 17:
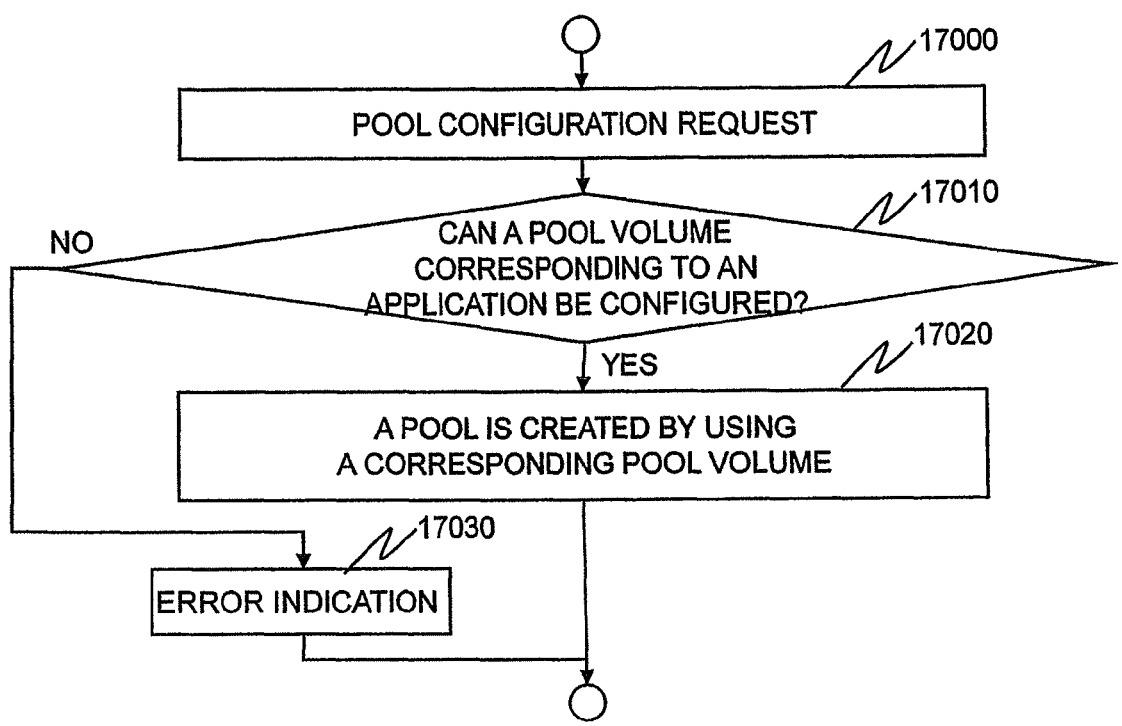
FIG. 17 shows a flowchart of a pool creation process.

FIG. 17 shows a flowchart of a pool creation process.

The pool configuration program 1232 receives a pool configuration request from a user via the pool configuration screen 14000 (see FIG. 14) (step 17000). The pool configuration program 1232 can also receive a pool configuration request in other forms such as a command line and a file as substitute for the pool configuration screen 14000.

In the next step, the pool configuration program 1232 judges whether a pool corresponding to a pool application that is configured in the pool configuration screen 14000 can be configured or not (step 17010). In the case in which a result of a judgment in the step 17010 is positive, a step 17020 is executed. On the other hand, in the case in which a result of a judgment in the step 17010 is negative, a step 17030 is executed.

This judgment is executed based on the information that has been input to the pool configuration screen 14000 and based on the pool configuration table 11000 (see FIG. 11).

For instance, there are configuration requests of two pools for the example shown in FIG. 14. For the first pool, a pool application is "performance emphasized" and an overall capacity is "100 G". In this case, according to the example shown in FIG. 11, in the case of "performance emphasized", it is found that the detail is "dispersion to a plurality of RAID groups/FC" and a size of one pool volume is "50 G". Consequently, since a capacity of the first pool is 100 G as shown by the example of FIG. 14, the first pool should be configured by volumes of 50 G based on two RAID groups composed of FC hard disks.

Whether or not there is a target RAID group is examined. For the example of the RAID group table 4000 shown in FIG. 4, a hard disk is FC and an unused capacity (2000, 1500) is 50 G or larger for each of RAID groups RG1 and RG2. Consequently, it is found that it is possible to create a volume for each 50 G Therefore, it is found that it is possible to configure the first pool required. As a result, the step 17020 is executed for the first pool.

On the other hand, in the example shown in FIG. 14, it is found that a pool application is "cost emphasized" and an overall capacity is "100 G" for the second pool of the two pools. In this case, according to the example shown in FIG. 11, in the case of "cost emphasized", it is found that the detail is "concentration to the RAID group/SATA" and a size of one pool volume is "50 G". Consequently, since a specified overall capacity of the second pool is 100 G as shown by the example of FIG. 14, the second pool should be configured by two volumes of 50 G based on one RAID group composed of SATA hard disks.

Whether or not there is a target RAID group is examined For the example of the RAID group table 4000 shown in FIG. 4, a hard disk is SATA and an unused capacity (150 G) is 100 G or larger for the hard disk that configures the RAID group RG3. Consequently, it is found that it is possible to create two volumes for 50 G. Therefore, it is found that it is possible to correspond to a. configuration request of the pool of "cost emphasized" shown in FIG. 14. As a result, the step 17020 is also executed for the second pool.

In FIG. 14, in the case in which an overall capacity of a pool corresponding to "cost emphasized" is "1 T" for instance, since the pool configuration program 1232 carries out the above described judgment process, it is found that a capacity of 1 T cannot be ensured from the RAID group RG3 of SATA. This is because an unused capacity is 150 G, which is less than 1 T. In this case, the step 17030 is executed for a pool corresponding to "cost emphasized" and "1 T".

In the step 17020, the pool configuration program 1232 creates a pool by a volume that has been created. That is to say, the pool configuration program 1232 creates necessary volumes from the RAID group, and creates a pool composed of the volumes for instance. More specifically, according to the example of the step 17010, for the first pool corresponding to "performance emphasized", a volume of 50 G is created from each of the RAID groups RG1 and RG2, an ID of the pool is generated, the pool ID is allocated to the pool, and the above created two volumes of 50 G are registered to the pool. Consequently, the first pool can be created. The normal volume configuration program 1233 indicates a creation of a normal volume to the storage 1000, thereby creating each of the two volumes of 50 G.

By the above operation, a creation of a pool is completed.

On the other hand, in the step 17030, the pool configuration program 1232 carries out an error indication. According to the example of the step 17010, in the case in which an overall capacity "1 T" is specified for a pool of "cost emphasized" shown in FIG. 14, since an unused capacity is less than 1 T, the step 17030 is executed. In this case, the pool configuration program 1232 can display not only a result that a pool cannot be created but also a cause of an error (for instance, an unused capacity is insufficient).

Figure 18:
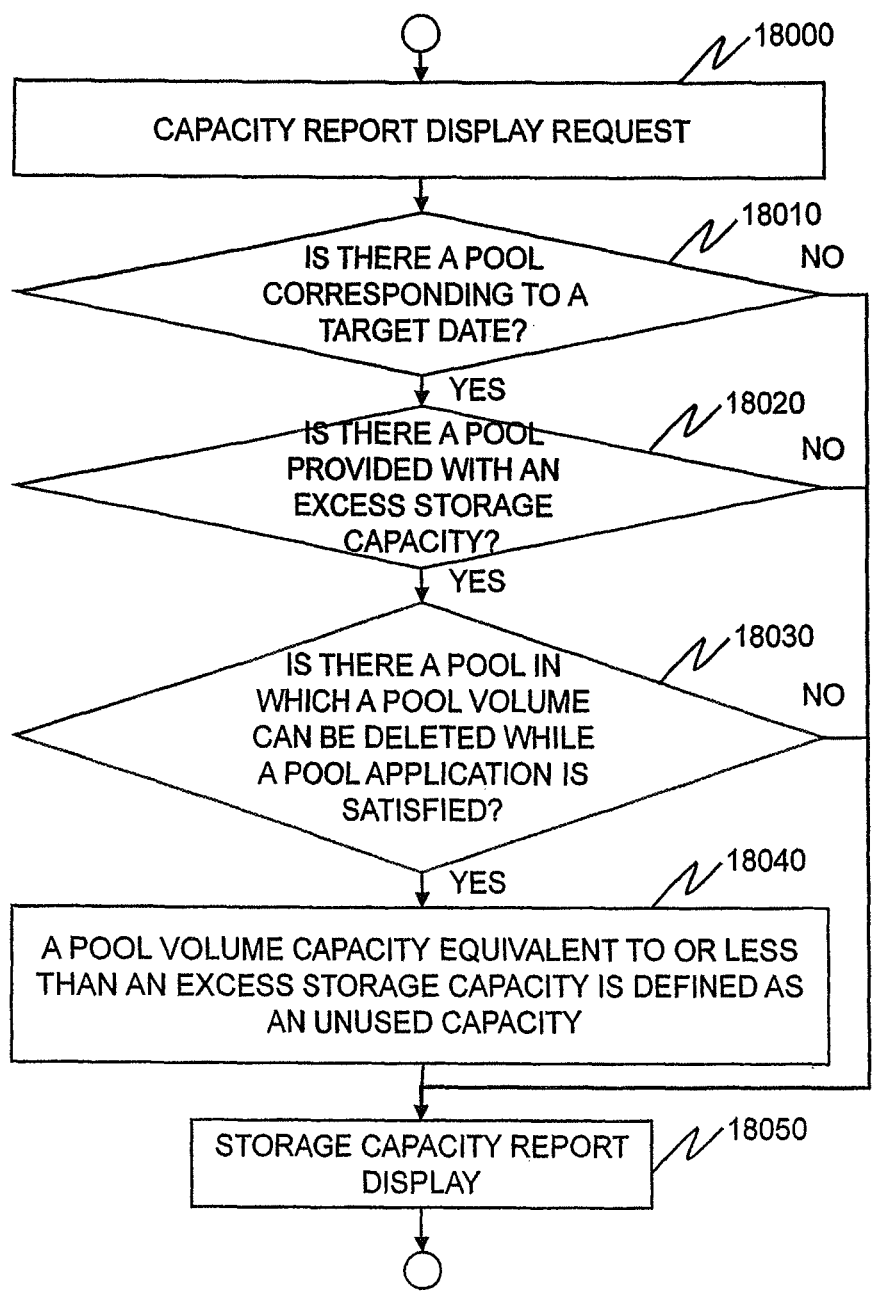
FIG. 18 shows a flowchart of a capacity report display process.

FIG. 18 shows a flowchart of a capacity report display process. The capacity report program 1234 receives a display request of a capacity report from a user via the screen 15000 shown in FIG. 15 (step 18000). The capacity report program 1234 can also receive a display request in other forms such as a command line and a file as substitute for the screen 15000.

In the next step, the capacity report program 1234 judges whether there is a pool that is a target of a capacity increase judgment (hereafter referred to as a judgment target pool) or not (step 18010). In the case in which a result of the judgment in the step 18010 is positive, a step 18020 is executed. On the other hand, in the case in which a result of the judgment in the step 18010 is negative, a step 18050 is executed without carrying out a step 18020 and subsequent steps.

Here, whether or not there is a judgment target pool is judged based on the target date 12030 in the table 12000 shown in FIG. 12 and the created date and time 13040 in the table 13000 shown in FIG. 13.

According to the examples shown in FIGS. 12 and 13, since the target date 12030 is that "at least six months elapse after the creation", the capacity report program 1234 detects that the pools P1, P2, and P3 are the judgment target pools among the pools P1 to P4. Consequently, the step 18020 is executed.

In the next step, the capacity report program 1234 judges whether there is a judgment target pool provided with an excess storage capacity or not (step 18020). In the case in which a result of the judgment in the step 18020 is positive, a step 18030 is executed. On the other hand, in the case in which a result of the judgment in the step 18020 is negative, a step 18050 is executed without carrying out a step 18030 and subsequent steps.

Here, whether or not there is a judgment target pool provided with an excess storage capacity is judged based on the capacity increase judgment 12010 in the table 12000 shown in FIG. 12 and the overall capacity 5020 and the allocated capacity 5030 in the table 5000 shown in FIG. 5 for the judgment target pool.

According to the examples shown in FIGS. 12 and 5, since the capacity increase judgment 12010 is that "an increase in a month is 3%", in the case in which the overall capacity 5020 of a pool is "100 G", it is defined that there is an increased amount of 3% of 100 G, that is, 3 G In other words, there is an increased amount of 21 G in the case of 7 months, 24 G in the case of 8 months, and 27 G in the case of 9 months. In the case in which an increased amount of a used capacity of the pool is less than the above increased amounts, it is judged that there is an excess storage capacity in the judgment target pool. Among the judgment target pools P1, P2, and P3, the judgment target pools provided with an excess storage capacity are the pool P1 in which an allocated capacity is less than 21 G (7 months) and the pool P2 in which an allocated capacity is less than 24 G (8 months), and the pool P3 in which an allocated capacity is at least 27 G (9 months) is a pool that is not provided with an excess storage capacity. The step 18030 is executed for the pools P1 and P2 provided with an excess storage capacity, and the step 18030 is not executed for the pool P3 that is not provided with an excess storage capacity.

Moreover, in the process of the step 18020, a judgment target pool in which an allocated capacity exceeds the threshold value 5040 can be judged as a pool that is not provided with an excess storage capacity.

In the next step, the capacity report program 1234 judges whether or not there is a pool in which a pool volume can be deleted while a pool application is satisfied for a judgment target pool that has been judged as a pool provided with an excess storage capacity (step 18030). In the case in which a result of the judgment in the step 18030 is positive, a step 18040 is executed. On the other hand, in the case in which a result of the judgment in the step 18030 is negative, a step 18050 is executed without carrying out a step 18040 and subsequent steps.

Here, whether or not there is a pool in which a pool volume can be deleted while a pool application is satisfied is judged based on the table 11000 shown in FIG. 11, the table 12000 shown in FIG. 12, the table 13000 shown in FIG. 13, and the table 8000 shown in FIG. 8.

According to the examples shown in FIGS. 11, 13, and 8, it is found that the application of the pool P1 is "performance emphasized" from FIG. 13. The pool of "performance emphasized" has a condition of "dispersion to a plurality of RAID groups" from FIG. 11. Moreover, it is found from FIG. 8 that the pool P1 is composed of two pool volumes based on separate RAID groups.

Consequently, in the case in which one of the two pool volumes is deleted for the pool P1, only one pool volume remains and the condition corresponding to "performance emphasized" cannot be satisfied. Therefore, it is judged that the pool P1 is not a pool in which a pool volume can be deleted while a pool application is satisfied.

On the other hand, according to the examples shown in FIGS. 11, 13, and 8, it is found that the application of the pool P2 is "cost emphasized". The pool of "cost emphasized" has a condition of "concentration to the RAID group" from FIG. 11. Moreover, it is found from FIG. 8 that the pool P2 is composed of two pool volumes based on one RAID group.

Consequently, even in the case in which one of the two pool volumes is deleted for the pool P2, the pool P2 is based on one RAID group invariably. Therefore, the condition corresponding to "cost emphasized" can be satisfied.

In the case in which it is judged that the condition related to the pool application is satisfied, the capacity report program 1234 calculates an excess storage capacity based on the method that is indicated by the pool reduction possible capacity 12020. In the case of the pool P2, since the overall capacity is "100 G" and the allocated capacity is "20 G", an excess storage capacity "56 G" can be obtained by calculating an expression that is indicated by the pool reduction possible capacity 12020. Since the pool P2 is composed of two volumes of 50 G, even in the case in which one volume is deleted, the excess storage capacity "56 G" is not exceeded. Consequently, the capacity report program 1234 decides that one volume can be deleted from the pool P2.

Moreover, in the case in which the pool P1 is provided with three pool volumes, two of the three pool volumes are pool volumes based on the RAID group RG1 (a capacity of one volume is 50 G), the other one of the three pool volumes is a pool volume based on the RAID group RG2 (a capacity of one volume is 50 G), and the allocated capacity of the pool is not changed (that is, 20 G), one pool volume can be deleted from the pool P1 similarly to the pool P2. Even in the case in which one pool volume is deleted from the pool P1, the condition related to the pool application "performance emphasized" is satisfied, a capacity of the pool volume is an excess storage capacity or less.

In the step 18040, the capacity report program 1234 defines a volume capacity that can be deleted from the pool (that is, a capacity of a calculated excess storage capacity or less) as an unused capacity.

According to the above example, it is found that one pool volume can be deleted from the pool P2. According to the example shown in FIG. 8, the pool P2 is composed of two pool volumes V102 and V104 of 50 G, and one of the two pool volumes can be handled as a pool volume that can be deleted. In addition, it is found that the volume is a volume based on the RAID group RG3.

There is a difference in a load depending on a volume to be deleted in some cases. For instance, it is thought that a time taken for a process required to delete a volume is shorter for a volume provided with a less allocated capacity as compared with a volume provided with a more allocated capacity. This is because an amount of data to be copied is less in the case in which data that has been stored in a chunk that has been allocated in a pool volume to be deleted is copied to a pool volume that is not deleted. In this case, the capacity report program 1234 deletes a volume provided with a less allocated capacity on a priority basis.

The capacity report program 1234 displays the capacity report screen 16000 (see FIG. 16) (step 18050). The capacity report is a report that is based on a result of the processes of the steps 18010 to 18040 for instance.

The unused capacities 16140 and 16250 that are displayed on the capacity report screen 16000 are based on a capacity that is obtained by adding an unused capacity defined in the step 18040 to an unused capacity 4040 for the RAID group. Consequently, the used capacities 16130 and 16240 that are displayed on the capacity report screen 16000 are based on a capacity that is obtained by subtracting an unused capacity defined in the step 18040 from a used capacity 4030 for the RAID group.

According to the above example, since the RAID groups RG1 and RG2 in the RAID groups of the storage 1000 are not provided with a pool volume to be deleted, an unused capacity is not changed. However, for the RAID group RG3, one pool volume of 50 G is to be deleted (that is to say, a deleted capacity is "50 G"). Consequently, for the RAID group RG3, a value "200 G" that is obtained by adding a deleted capacity "50 G" to "150 G" indicated by the unused capacity 4040 is displayed as an unused capacity 16250 in the capacity report screen 16000. Moreover, a value "100 G" that is obtained by subtracting a deleted capacity "50 G" from "150 G" indicated by the used capacity 4030 of the RAID group RG3 is displayed as a used capacity 16240 in the capacity report screen 16000.

In accordance with the embodiment of the present invention described above, not only an excess storage capacity of a pool but also an unused capacity for a plurality of RAID groups of a plurality of storages 1000 can be figured out. Moreover, an unused capacity of the overall storages (a capacity that is specified from an unused capacity of the RAID group) and an unused capacity of the RAID group in which a capacity equivalent to or less than an excess storage capacity is defined as an unused capacity and to which the defined unused capacity is reflected are displayed for a plurality of storages (and a plurality of RAID groups).

Moreover, in the embodiment of the present invention, other kinds of pools (such as a pool that stores the differential information or journal information of a volume of a copy source) can also be adopted as substitute for or in addition to a pool that stores data to a virtual volume. That is to say, a pool that stores the differential information of a volume and a pool that stores the journal information of a volume can be implemented by an aggregate of at least one real volume. Consequently, the embodiment of the present invention can also be applied to the pools.

For a calculating method that is defined by the pool reduction possible capacity 12020, other methods such as the following method can also be adopted:
figuring out a capacity increase trend;
predicting an increased amount in a period (for instance, six months later); and making other than the increased amount an excess storage capacity.

For instance, in the case in which a capacity of a pool is 1 T, an allocated capacity at a report point is 200 G, and a capacity increase trend is 20 G per month, an increase of 240 G one year later can be predicted. Consequently, it is predicted that an allocated capacity is 200+240=440 G one year later. Therefore, an unused capacity 560 G (1 T–440 G) at this point can be an excess storage capacity. In a practical sense, since one volume size 11030 of the pool configuration table 11000 is 50 G, 550 G that is a multiple number of 50 is a capacity that can be deleted.

Moreover, in the case in which one volume size 11030 of the pool configuration table 11000 is not a fixed value shown by the example of FIG. 11 but a variable value such as "50 G or less", a correspondence due to a change of a pool volume can be considered.

Moreover, in the step 18030 for the example of FIG. 18, it is not decided that a pool volume can be deleted since the pool P1 has the pool application of "performance emphasized". However, in the case in which the pool P1 does not have the pool application of "performance emphasized", it is decided that an excess storage capacity of "56 G" can be deleted and it is sufficient for the pool P1 to have an overall capacity of 44 G. Consequently, the CPU 1220 carries out the following processes:

creates a volume (V1000) of 22 G based on the RAID group RG1, creates a volume (V2000) of 22 G based on the RAID group RG2, and configures the volumes to the pool P1;

deletes the volumes V 100 and V101 that have configured the pool P1; and copies data that has been stored into an allocated chunk in the volumes V100 and V101 that are deleted to the volumes V 1000 and V2000.

By the above processes, a pool volume of the pool P1 is reconfigured while a pool application is satisfied, and it is decided that a capacity can be deleted. In this case, it is decided that the RAID group RG1 is provided with an unused capacity of 28 G and the RAID group RG2 is provided with an unused capacity of 28 G in the step 18040, and a capacity report is displayed in the step 18050.

However, since a capacity of a volume for a change must be ensured, it is necessary to judge whether or not a capacity of a volume for a change can be ensured. In the case in which a capacity of a volume for a change cannot be ensured, the processes shown in FIG. 18 can be executed.

A change of a pool volume is executed in the above embodiment. However, it can be expected that the similar effects can be obtained by a data migration between pools as substitute for the above processes.

More specifically, in the case in which a pool configuration in which an application is "performance emphasized", a capacity is "44 G", and the number of pools is one is executed via the pool configuration screen 14000 shown in FIG. 14 for instance, the pool that is created for the configuration is set to P100. Moreover, the pool configuration program 1232 makes a virtual volume having a virtual capacity equivalent to a virtual capacity of a virtual volume which is made to correspond to the pool P1 (a virtual capacity of each of the virtual volumes V1 and V2 is "1 T" in the example of FIG. 6) correspond to the pool P100 (in this case, two virtual volumes having a virtual capacity 1 T are configured). Furthermore, the pool configuration program 1232 executed a data migration between a virtual volume associated with the pool P1 and a virtual volume associated with the pool P100. The pool P1 that is a migration source is then deleted.

A change of a pool volume and a data migration between pools can be executed even in the case in which an application on the host side is changed. For instance, in the case in which an application of a use by the host is changed from a first application (such as an application is "performance emphasized") to a second application (such as an application is "cost emphasized"), a pool volume of the first application and a pool volume of the second application are exchanged for the pool volumes in the pool, or a data migration is executed from a pool of the first application to a pool of the second application. Consequently, a configuration can be changed without affecting an access on the host side.

Moreover, the management computer 1200 deletes a volume based on an unused capacity (a capacity in which a capacity equivalent to or less than an excess storage capacity is reflected to an unused capacity of the RAID group) without displaying a capacity report. Alternatively, the management computer 1200 can create a volume.

[Embodiment 2]

A second embodiment of the present invention will be described below. At that time, differences from the first embodiment of the present invention will be described mainly, and the detailed descriptions of the elements equivalent to those of the first embodiment are omitted.

FIG. 19 shows a capacity report screen 26000.

The capacity report screen 26000 is an extension of the screen 16000 shown in FIG. 16. More specifically, the storage capacity report 16100 is provided with "a capacity that is deleted from a pool" 19000 and the RAID group capacity report 16200 is provided with "a capacity that is deleted from a pool" 19100.

"A capacity that is deleted from a pool" is a capacity of a pool volume that can be deleted as shown in FIG. 18. In other words "a capacity that is deleted from a pool" is a capacity of a pool volume that can be deleted among the unused capacity 16140 or 16250.

According to the example of FIG. 18, it is indicated that "a capacity that is deleted from a pool" 19000 is 50 G and an unused capacity of all RAID groups is 550 G that is obtained by subtracting 50 G from 600 G for the storage of the storage ID 1.

Moreover, according to the example of FIG. 18, it is indicated that "a capacity that is deleted from a pool" 19100 is 50 G and an unused capacity of the RAID group RG3 is 200 G that is obtained by subtracting 50 G from 250 G.

Moreover, for a change of a pool volume and a data migration between pools, a capacity that can be deleted by each process can be indicated in the capacity report.

According to the example of FIG. 18, for a change of a pool volume and a data migration between pools, it is indicated that 56 G can be deleted for RG1. The capacity report is provided with "a capacity that is deleted by a change of a pool volume" and/or "a capacity that is deleted by a data migration between pools". In these cases, since a reconfiguration is executed for creating a new volume or the like, "a capacity that is deleted by a change of a pool volume" and/or "a capacity that is deleted by a data migration between pools" can be a capacity equivalent to an excess storage capacity that has been calculated.

In the case in which at least two information elements among "a capacity that is deleted from a pool", "a capacity that is deleted by a change of a pool volume", and "a capacity that is deleted by a data migration between pools" are displayed, it is necessary to decide a kind of an information element that is used to display the calculation of a used capacity and an unused capacity. Consequently, a used capacity and an unused capacity can be displayed for only the RAID group, and an actual unused capacity can be a capacity that is defined based on any of the information elements of "a capacity that is deleted from a pool", "a capacity that is deleted by a change of a pool volume", and "a capacity that is deleted by a data migration between pools" for instance. Moreover, an adoption of any of the information elements of "a capacity that is deleted from a pool", "a capacity that is deleted by a change of a pool volume", and "a capacity that is deleted by a data migration between pools" can be entered in the column of an unused capacity.

Moreover, it can be set that a user can select a display from the capacity report screens of FIGS. 16 and 19 by a means such as a GUI (Graphical User Interface) and a property file or the like.

Moreover, in the case in which each of "a capacity that is deleted from a pool", "a capacity that is deleted by a change of a pool volume", and "a capacity that is deleted by a data migration between pools" is applied and a volume capacity is required as a practical matter, a time taken for providing a capacity can be displayed in the report. For instance, it takes one minute per 1 G for a deletion of a pool volume, two minutes per 1 G for a change of a pool volume, and three minutes per 1 G for a data migration between pools. The above information can be measured in advance, can be managed by the management computer 1200 or the storage 1000, and can be displayed as additional information of each column in the case in which a report is provided.

What is claimed is:

1. A management computer coupled to a storage apparatus that is accessed from an external device, the storage apparatus managing a pool that is provided with at least one real volume based on a RAID (Redundant Array of Independent (or Inexpensive) Disks) group, the management computer comprising:
   a storage resource; and
   a processor that is coupled to the storage resource,
   wherein the storage resource stores the pool management information, which includes a pool application information that indicates a pool application for the pool and an application condition information that indicates the condition for the pool application, and
   wherein the processor carries out the following processes (A) to (D):
   (A) calculating an excess storage capacity based on a pool usage status for the pool;
   (B) specifying a pool application for the pool and the condition for the pool application based on the pool management information;
   (C) judging whether the specified condition would be satisfied even if a storage area having a storage capacity equivalent to or less than the calculated excess storage capacity were to be deleted from the pool; and
   (D) defining a capacity equivalent to or less than the excess storage capacity as an unused capacity in the case in which the result of the judgment in the process (C) is positive.

2. The management computer of claim 1, further comprising a display device, and wherein the processor is configured to implement an interface component via the display device that provides a display screen and receives a user input selection on the display screen requesting a respective storage capacity report for the storage apparatus, the RAID group, or both the storage apparatus and the RAID group.

3. The management computer of claim 2, wherein the interface component is implemented to output the storage capacity report on the display screen for each of the storage apparatus and the RAID group that is requested by the user input selection, and wherein the respective storage capacity reports for the storage apparatus and the RAID group indicate an overall capacity, a used capacity, and an unused capacity for the storage apparatus and the RAID group respectively.

4. The management computer of claim 1, further comprising a display device, and wherein the processor is configured to output a storage capacity report for the storage apparatus that indicates an overall capacity, a used capacity, and an unused capacity for the storage apparatus to a display screen implemented by an interface component via a display device.

5. The management computer of claim 1, further comprising a display device, and wherein the processor is configured to output a storage capacity report for the RAID group that indicates an overall capacity, a used capacity, and an unused capacity for the RAID group to a display screen implemented by an interface component via a display device.

6. The management computer of claim 1, further comprising a display device, and wherein the processor is configured to output respective storage capacity reports for the storage apparatus and the RAID group that indicate an overall capacity, a used capacity, and an unused capacity for the storage apparatus and the RAID group respectively to a display screen implemented by an interface component via a display device.

7. A computer system, comprising:
   a storage apparatus that is accessed from an external device, the storage apparatus managing a pool that is provided with at least one real volume based on a RAID (Redundant Array of Independent (or Inexpensive) Disks) group; and
   a management computer coupled to the storage apparatus, the management computer comprising a storage resource, and a processor that is coupled to the storage resource, and
   wherein the storage resource stores the pool management information, which includes a pool application information that indicates a pool application for the pool and an application condition information that indicates the condition for the pool application, and
   wherein the processor carries out the following processes (A) to (D):
   (A) calculating an excess storage capacity based on a pool usage status for the pool;
   (B) specifying a pool application for the pool and the condition for the pool application based on the pool management information;
   (C) judging whether the specified condition would be satisfied even if a storage area having a storage capacity equivalent to or less than the calculated excess storage capacity were to be deleted from the pool; and
   (D) defining a capacity equivalent to or less than the excess storage capacity as an unused capacity in the case in which the result of the judgment in the process (C) is positive.

8. The computer system of claim 7, further comprising a display device, and wherein the processor is configured to implement an interface component via the display device that provides a display screen and receives a user input selection on the display screen requesting a respective storage capacity report for the storage apparatus, the RAID group, or both the storage apparatus and the RAID group.

9. The management computer of claim 8, wherein the interface component is implemented to output the storage capacity report to the display screen for each of the storage apparatus and the RAID group that is requested by the user input selection, and wherein the respective storage capacity reports for the storage apparatus and the RAID group indicate an overall capacity, a used capacity, and an unused capacity for the storage apparatus and the RAID group respectively.

10. The management computer of claim 7, further comprising a display device, and wherein the processor is configured to output a storage capacity report for the storage apparatus that indicates an overall capacity, a used capacity, and an unused capacity for the storage apparatus to a display screen implemented by an interface component via a display device.

11. The management computer of claim 7, further comprising a display device, and wherein the processor is configured to output a storage capacity report for the RAID group that indicates an overall capacity, a used capacity, and an unused capacity for the RAID group to a display screen implemented by an interface component via a display device.

12. The management computer of claim 7, further comprising a display device, and wherein the processor is configured to output respective storage capacity reports for the storage apparatus and the RAID group that indicate an overall capacity, a used capacity, and an unused capacity for the storage apparatus and the RAID group respectively to a display screen implemented by an interface component via a display device.

13. A method for managing a storage apparatus that is accessed from an external device, the storage apparatus managing a pool that is provided with at least one real volume based on a RAID (Redundant Array of Independent (or Inexpensive) Disks) group, the method comprising:
   calculating an excess storage capacity based on a pool usage status for the pool;
   specifying a pool application for the pool and the condition for the pool application based on pool management information that is stored by a storage resource and includes a pool application information that indicates a pool application for the pool and an application condition information that indicates the condition for the pool application;
   judging whether the specified condition would be satisfied even if a storage area having a storage capacity equivalent to or less than the calculated excess storage capacity were to be deleted from the pool; and
   defining a capacity equivalent to or less than the excess storage capacity as an unused capacity upon judging that the specified condition is satisfied.

14. The method of claim 13, further comprising receiving a user input selection requesting a respective storage capacity report for the storage apparatus, the RAID group, or both the storage apparatus and the RAID group on a display screen implemented by an interface component via a display device.

15. The method of claim 14, further comprising outputting the storage capacity report on the display screen for each of the storage apparatus and the RAID group that is requested by the user input selection, and wherein the respective storage capacity reports for the storage apparatus and the RAID group indicate an overall capacity, a used capacity, and an unused capacity for the storage apparatus and the RAID group respectively.

16. The method of claim 13, further comprising outputting a storage capacity report for the storage apparatus that indicates an overall capacity, a used capacity, and an unused capacity for the storage apparatus to a display screen implemented by an interface component via a display device.

17. The method of claim 13, further comprising outputting a storage capacity report for the RAID group that indicates an overall capacity, a used capacity, and an unused capacity for the RAID group to a display screen implemented by an interface component via a display device.

18. The method of claim 13, further comprising outputting respective storage capacity reports for the storage apparatus and the RAID group that indicate an overall capacity, a used capacity, and an unused capacity for the storage apparatus and the RAID group respectively to a display screen implemented by an interface component via a display device.

* * * * *